June 13, 1967 E. J. DUFFY ET AL 3,325,820
TIME CARD RECORDER
Filed Oct. 7, 1966 10 Sheets-Sheet 3

FIG. 3

- LOCK TIME UNIT AND START TIME STORAGE
- NUDGE CARD AND FEED RIBBON
- RAISE E.T. (2 ND. ENTRY ONLY)
- MOVE INTERPOSER BARS
- PUNCH
- PRINT
- TRIP RELEASE FOR HANDLES

|←——— STROKE OF HANDLE ———→|

FIG. 4

INVENTORS
E. J. DUFFY
W. K. GROOME
BY ATTORNEY

INVENTORS
E. J. DUFFY
W. K. GROOME
BY ATTORNEY

June 13, 1967 E. J. DUFFY ET AL 3,325,820
TIME CARD RECORDER
Filed Oct. 7, 1966 10 Sheets-Sheet 7

INVENTORS
E. J. DUFFY
W. K. GROOME
BY ATTORNEY

INVENTORS
E. J. DUFFY
W. K. GROOME
BY ATTORNEY

INVENTORS
E. J. DUFFY
W. K. GROOME

BY
ATTORNEY

United States Patent Office

3,325,820
Patented June 13, 1967

3,325,820
TIME CARD RECORDER
Edward J. Duffy, Bernardsville, and Warren K. Gromme, Belleville, N.J., assignors to Calculagraph Co., East Hanover, N.J., a corporation
Filed Oct. 7, 1966, Ser. No. 585,171
9 Claims. (Cl. 346—83)

This application is filed as a continuation in part of our copending application filed May 19, 1964, Ser. No. 368,672, now abandoned.

This invention relates to a device for recording times of initiation and ending of time periods in military or twenty-four hour time for time sensing, recording and other calculating purposes without need for manual reset. The device comprises the casing having timing means therein such that a card may be inserted into a slot in the casing to a position of registration whereupon time of initiation of a time period will be automatically marked thereon. After completion of the time period the card may be reinserted whereupon termination of the time period will be automatically marked thereon. The marking operations are performed automatically, eliminating the chance of operator's error.

The marking operations above described may be sensing markings such as punching of holes in the card or visual markings such as time stamps, impressed on the card, in addition may include a serial number, key or identity mark concurrently placed on the card to verify the fact that a given card was placed in a single time machine for the initiation and termination markings thereon, and a stamped record of the total elapsed time.

A feature of the device is a time unit which keeps correct 24 hour or military time without manual reset being required at 24 to 0 hour changeover; mechanical means for converting (or reading) this time for punching or printing time of day; means for verifying or reading this time visually; means for easily resetting this time to agree with clock time in the event of power failure.

The device is adapted to be readily actuated by the operator without requiring the operator to do other than insert the card and move a lever or other actuator, further reducing likelihood of error in the operations. The device is essentially fool-proof and automatic in operation and highly accurate, reliable and durable in use.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts.

Figure 3:
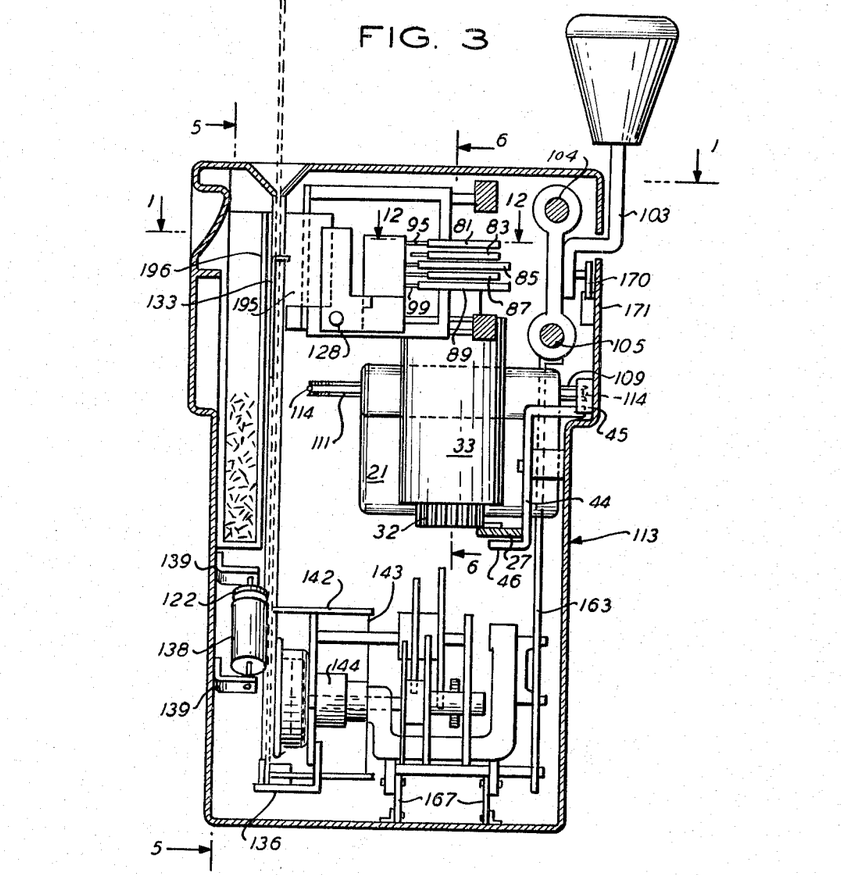
FIG. 3 is a transverse sectional elevational view thereof, taken at line 3—3 of FIG. 1.
Figure 5:
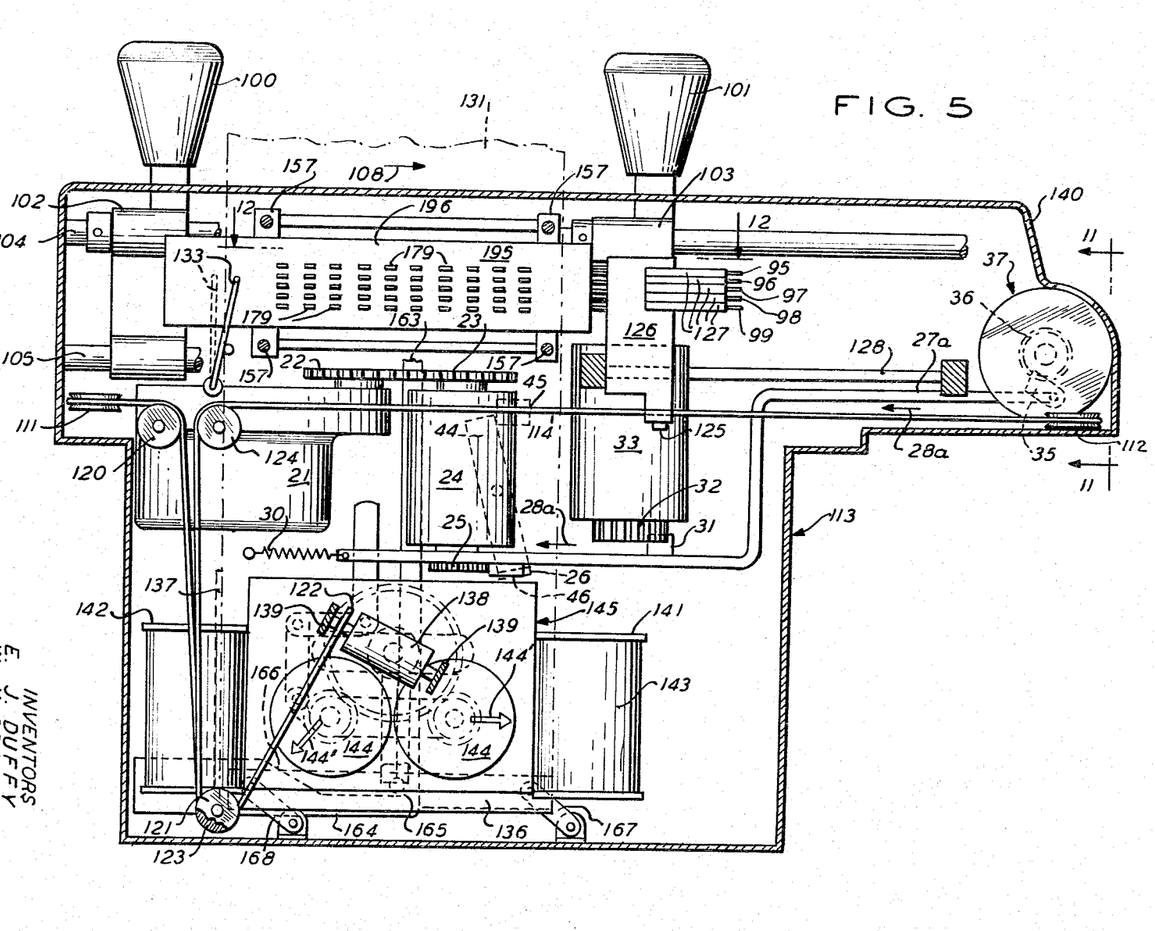
FIG. 5 is a vertical longitudinal elevational, partly sectional view, taken at line 5—5 of FIG. 1 and at line 5—5 of FIG. 3.
Figure 6:
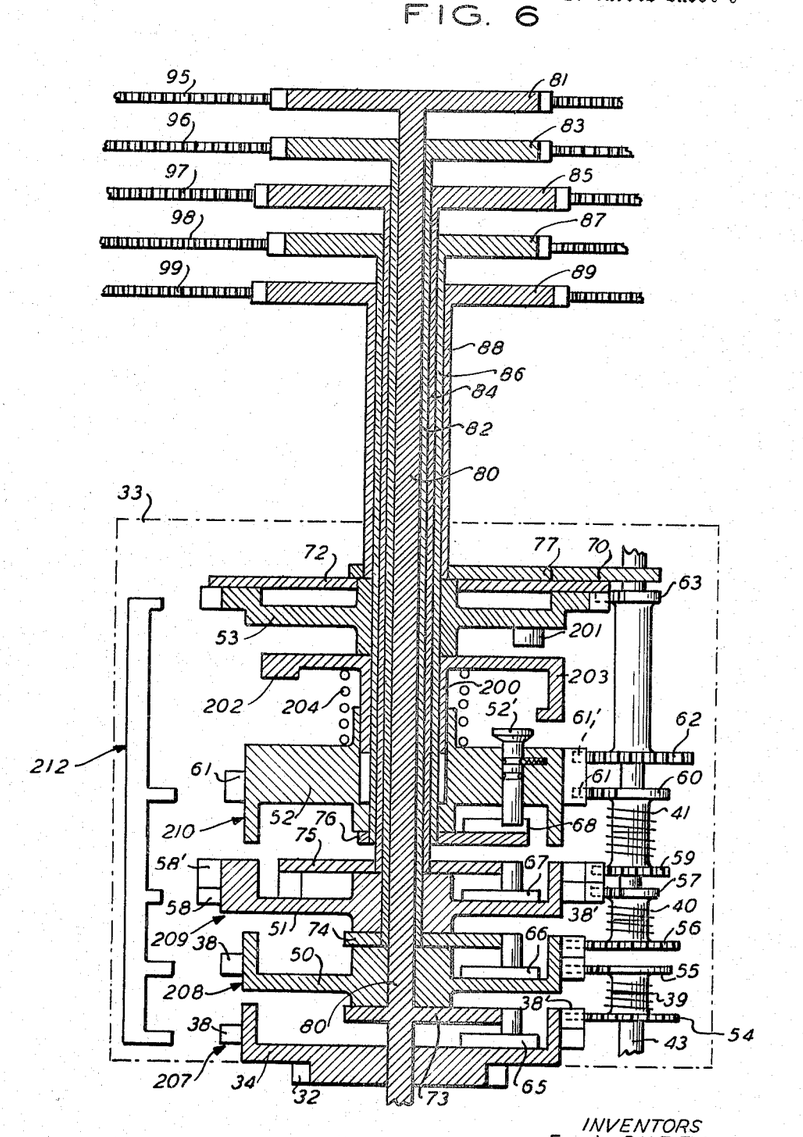
FIG. 6 is an enlarged, vertical sectional view, taken at line 6—6 of FIG. 3.
Figure 7:
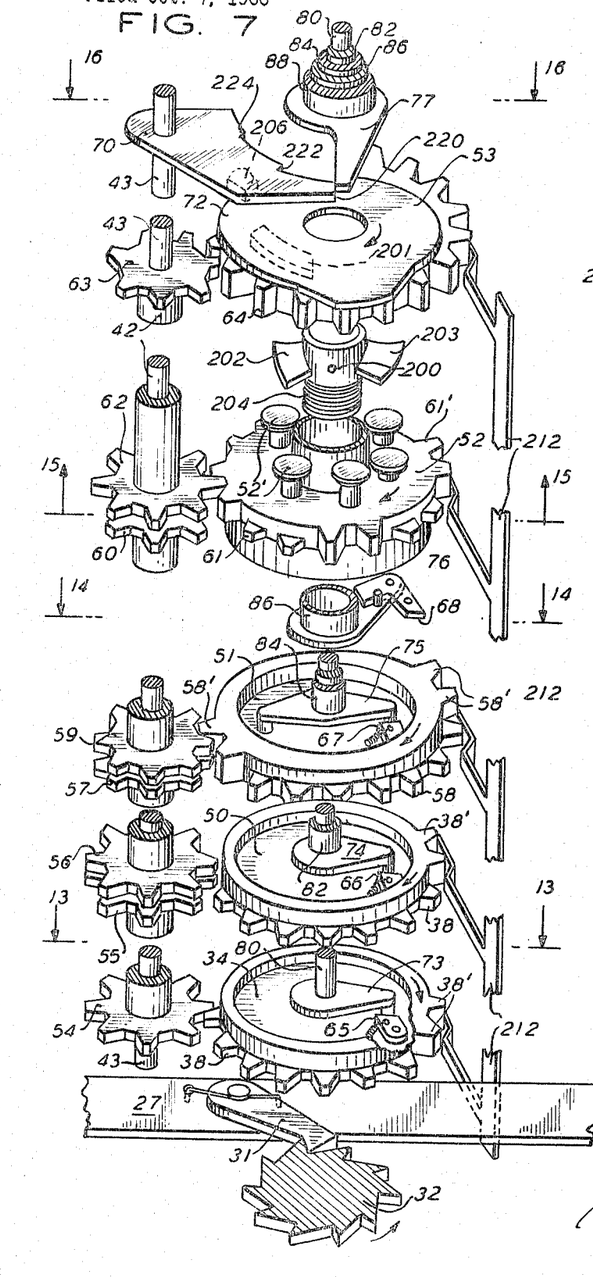
FIG. 7 is an exploded perspective view of the device in the dotted lower portion 33 of FIG. 6, with the parts and direction of rotation arranged for easier understanding.

The device may be actuated from a suitable power source or drive means such as an electric or other motor 21 (FIGS. 1, 3 and 5) the motor armature or other drive shaft rotating at given time cycles directly or through an intermediate gear or drive change device or otherwise. It will be understood that in lieu of motor 21 driving power may be attained otherwise. However, by incorporating motor 21 or the like in the casing 113, the device is made self contained and may be plugged into or connected with a conventional electric circuit. The motor 21 (FIG. 1) through gear or other means drives a gear 22 driving gear 23 of time storage 24 (FIG. 5). Time storage 24 embodies output cam 25 which in turn actuates the mechanism of the device as below described. The output cam 25, having drop off edge 29 (FIG. 1) alternately actuates the follower 26 fixed to the arm 27 (FIGS. 1, 3, 5 and 7), to move said arm against resistance of spring 30 (FIG. 5), the arm 27 then moving in the direction of arrow 28a (FIGS. 1, 5 and 7) responsive to the spring 30 when the drop off edge 29 (FIG. 1) of the cam moves past the follower 26. When, as above noted, the spring 30 moves the arm 27 in the direction of the arrow 28a a spring loaded pawl 31 (FIGS. 1, 5 and 7) on the arm 27 engages a ratchet 32 of time wheel 34 in time unit 33 (FIGS. 3, 5, and 6). The ratchet 32 is unitary with the underside of the time wheel 34 though in FIG. 7 it is shown separated for the sake of clarity.

Arm 27a (FIGS. 1 and 5) is an extension (at a different plane, FIG. 5) of the arm 27 and moves in unison therewith in the direction of the arrow 28a. Extension 27a of arm 27 (FIG. 5) drives pawl 35 (FIGS. 1 and 5) which drives ratchet 36 (FIGS. 5 and 11) thus driving the straight line time indicator 37 (FIGS. 1, 2, 5 and 11) which may be of any desired or conventional construction, preferably at the front 140 of the device, to indicate the correct time of day.

The time unit 33 embodies 5 time wheels, related gearing and sensing elements, which jointly determine the time values registered by punching or printing means, for in or initiation time and out or termination time of a time period. The time wheel 34 (FIG. 7) is for tenths of minutes; time wheel 50 is for unit minutes; time wheel 51 is for tens of minutes; time wheel 52 is for unit hours; time wheel 53 is for tens of hours.

The time period registered may be 5 digits (162 and letter suffixes in FIG. 10) at initiation and 3 digits (169 and letter suffixes) for completion where, as in telephone conversation monitoring, the record is primarily intended for time periods of one hour or less. Obviously the termination time may also be 5 digits and include hours and tens of hours, if desired.

For continuity in further describing this invention punching of initiation and termination times will be deemed to cover printing also.

The first time wheel 34 (FIGS. 6 and 7) actuated by the pawl 31 actuates the remaining time wheels 50–53 through the train of spool gears 54, 55, 56, 57, 59, 60, 62 and 63 the gearing arrangement which is below described more fully, on the time wheels, being such as is desired according to the various values intended. To that end the periphery of time wheels 34, 50, 51 and 52 (FIGS. 13–16) may include lower full gears 38, 58 and 61 and upper partial gears or spaced gear teeth arrangements. Time wheels 34 and 50 may each thus have two consecutive teeth 38' on upper partial gear. Time wheel 51 may have two sets of two consecutive upper gear teeth 58'; time wheel 52 may have five sets of two consecutive upper gear teeth 61'.

The periphery of time wheel 53, being last, need only include full gear 64.

It will be obvious that time wheel 34 may be actuated, in some other application, thru lower full gear 38.

The time wheels 34, 50 and 51 may have sensing stops 65 and 67 spring urged against pins fixed to said time wheels and moving with said wheels with passage of time and adapted to be engaged by sensors 73, 74, and dual sensor 75 carried by shaft 80 and tubes 82 and 84 (FIGS. 6 and 7) respectively.

Sensor 68, for time wheel 52, is mounted on arm 76, carried on tube 86, and spring urged against a pin on said arm and adapted to engage movable pins 52' which act as the sensing stops.

Sensing stops 70, for time wheel 53 (FIGS. 7 and 16), is a member pivoted on shaft 43; on the underside of the sensing stop 70 is a lobe 206 which may be a fixed part of said stop and acts as a follower on cam 72 integral with time wheel 53, to thus adjust the position of said stop 70. Sensor 77 carried by tube 88 is adapted to engage the three steps shown on stop 70.

The relationship of said sensors and sensing stops is such that continuous passage of time, in all time wheels, is possible due to pivotal action of either the sensor or stop.

The shaft 80 and tubes 82, 84, 86, 88 are secured at their opposite ends, respectively, to the respective (next numbered) gears 81, 83, 85, 87, 89 (FIGS. 1, 3, 5, 6 and 12) meshing with racks 95–99 and the sensing elements 73–77. The racks 95–99 are elongated, typical rack 95 being shown in FIGS. 5, 12, 19 and 1.

Figure 1:
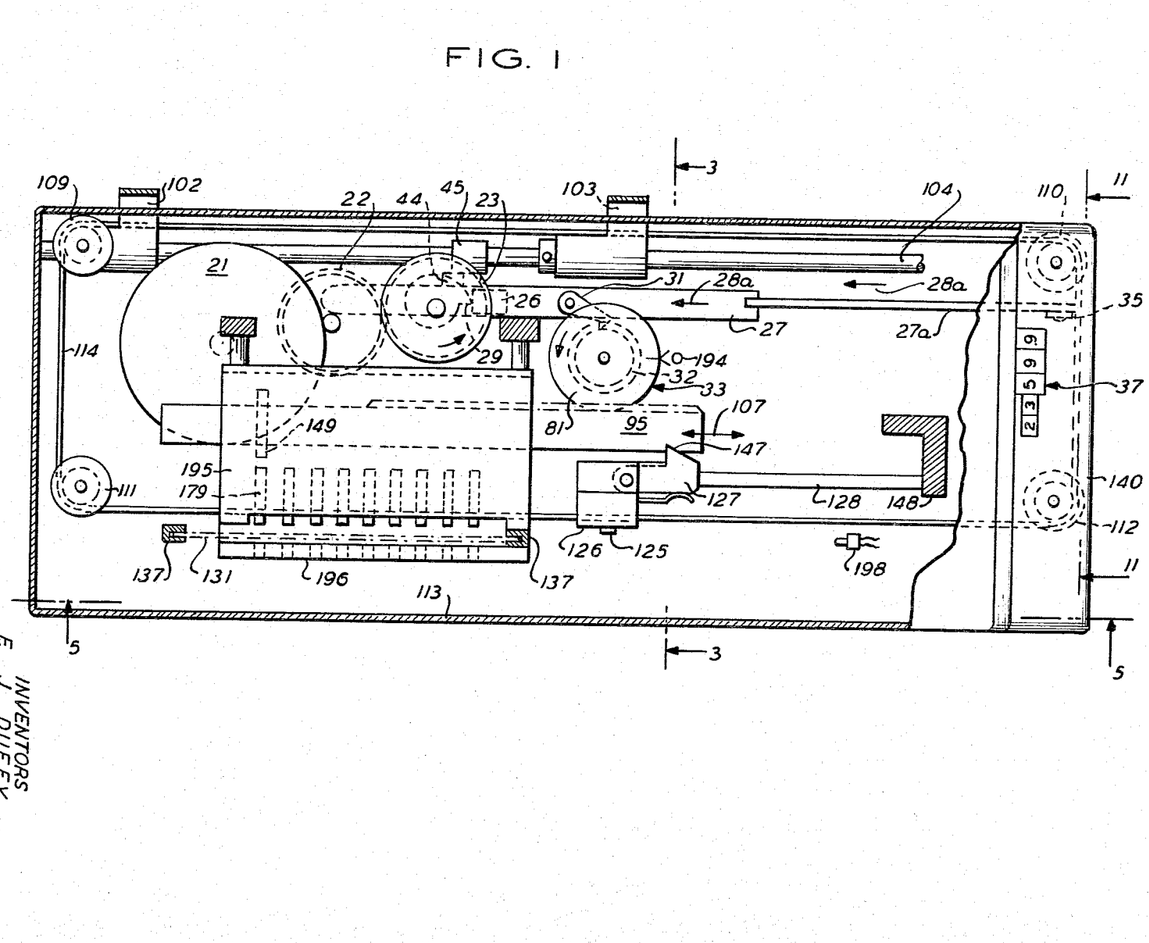
FIG. 1 is a top plan view of the time mechanism embodying the invention, with the cover shown partly broken, taken at line 1—1 of FIG. 3.
Figure 2:
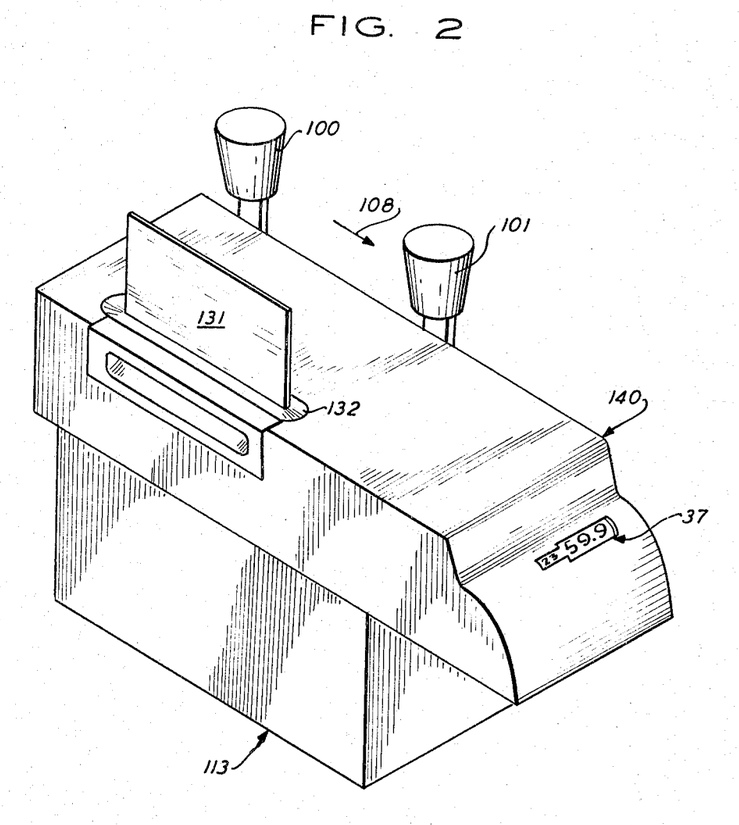
FIG. 2 is a perspective view thereof.

The racks 95–99 are actuated on movement of the operating handles 100, 101 (FIGS. 2, 5, 3 and 17) as follows: The operating handles (FIG. 17) extend from brackets 102 and 103, which in turn slidably engage parallel mounting bars 104, 105 secured to the casing 113 in any desired or convenient manner. The racks are slidably mounted in suitable supports such as a slotted comb 106 (FIG. 12) so that the racks may be reciprocated as indicated by the arrow 107 (FIGS. 1, 12 and 19) on movement of either of the operating handles 100, 101 as indicated by the arrow 108 (FIGS. 2 and 5). Suitable means may be provided for connecting the operating handles 100, 101 with the racks 95–99. As shown, for example, in the drawings (FIGS. 1, 3, 5) idler pulleys 109–112 may be suitably mounted in the casing 113 and a belt 114 entrained around said pulleys (FIG. 17) collars 115, 116 fixed to the belt 114 and adapted to be selectively engaged by forks 117, 118 (FIG. 17) extending from the brackets 102, 103 and straddling the belt 114. Thus, it will be apparent, that for operation of the device it is only necessary for the belt 114 to be electrically or manually moved a limited distance (arrow 90, FIG. 17) to operate the device. Movement of either operating handle 100 or 101 in either direction (arrow 108, FIG. 17) will correspondingly move the belt 114 urged by spring 160 in one direction. The belt 114, in addition to being entrained around the pulleys 109–112, as above noted, may be further entrained (FIG. 5) around another pulley 120 and thence downwardly around a pulley 121, thence upwardly and around the pulley 122 and thence downwardly again and around a pulley 123 (which is directed behind pulley 121) and thence upwardly and around the pulley 124 and thence around the main pulley 112.

The belt 114 has keyed thereto as at 125 (FIGS. 5, 12 and 1) the carriage 126 which has a series of pawls or clutch fingers 127 pivotally mounted thereon, terminating in nosings and spring urged counterclockwise (viewing the parts as in FIG. 12) toward the racks 95–99 (there being one so mounted pawl for each rack). The carriage 126 is freely slidable on guide 128 as indicated in (FIGS. 1, 3 and 5).

*Operation of the machine*

The card 131 (FIG. 10) when inserted into the guide 132 (FIGS. 2 and 3) strikes a sensing element, schematically indicated at 133 (FIG. 5) in full lines, which is cammed to the dotted line position 133, out of direct line engagement with the card, on engagement with the angularly cut corner 134 at the lower end of the card. If the card is improperly inserted, the square corners 135, 135a and 135b of the card engage the sensing element, the latter remains in its full line position 133 (FIG. 5) blocking further movement of the card into the machine so that the operator may know that the insertion was improper. In addition, a homing arrangement may be provided to make certain that the card is fully inserted and seated in its proper position in the casing for correct registration with the printing, punching and other mechanisms.

An example of a homing arrangement, illustrated in FIGS. 3 and 5, may include a bottom stop 136 and edge guides or stops 137 annd 137'. A roller 138 is angularly mounted in suitable brackets 139, and may be actuated by belt 114, the roller 138 being keyed to the pulley 122 around which the belt 114 is entrained as above described and shown in FIG. 5. Thus, on operating the handle after insertion of the card, the roller 138 will rotate, engaging the card and moving it downwardly against the bottom stop 136 and against the left hand guide 137, correctly seating the card.

When the card is initially inserted by the operator for initiation of a time period, handle 101 is moved by the operator toward the front 140 (FIGS. 1, 2 and 5) of casing 113; the card is nudged into seated position by means of roller 138 as above described.

Figures 10, 11:
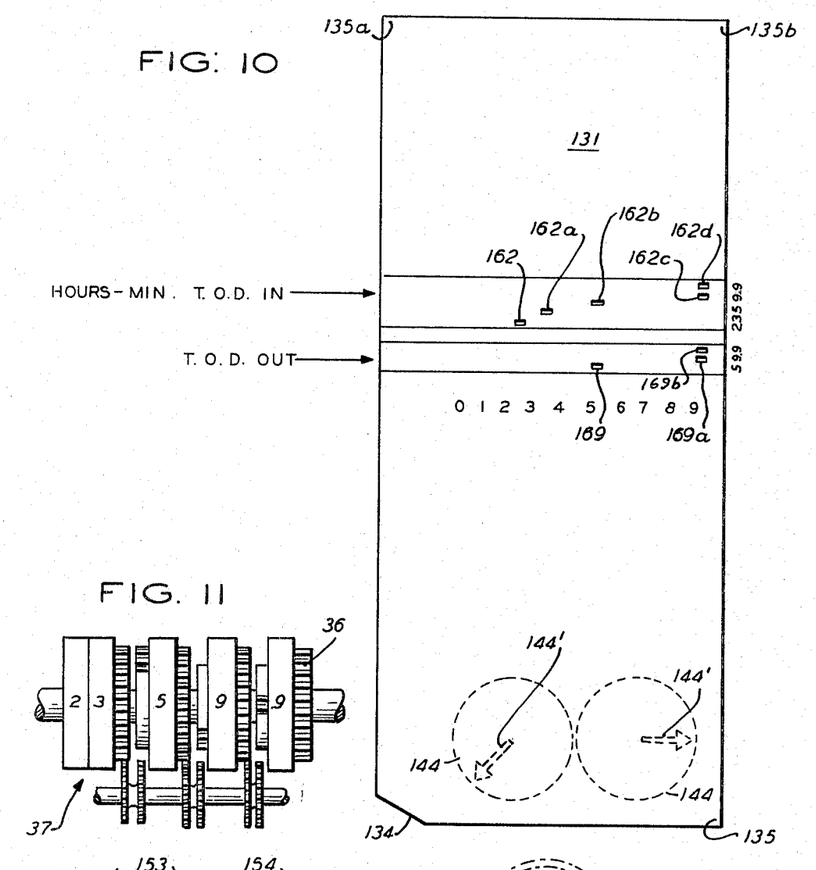
FIG. 10 is a plan view of a typical card on which the device of this invention may mark the time-of-day-in in 5 digits in tens of hours (162) hours (162a) tens of minutes (162b) and minutes (162c) and tenths of minutes (162d) and time-of-day out in 3 digits, in tens of minutes 169, minutes 169a and tenths of minutes 169b and elapsed time stamps 146, 146′.
FIG. 11 is an elevational view of a straight line time indicator, taken at line 11—11 of FIG. 1, and at line 11—11 of FIG. 5.

The belt 114 may also actuate a ribbon 143 (FIGS. 3 and 5) entrained around ribbon spools 141, 142 so that printing cups 144 and pointers 144' (FIGS. 3 and 5) in the printing unit 145 may impress time indicia 146, 146' (FIG. 10) on the card 131 on the side opposite the FIG. 10 viewer (right hand side of the card when viewed as in FIG. 3). The printing mechanism embodied in print unit 145 may be of any desired or convenient construction, for example, such as that shown in Patent 2,259,677, Oct. 21, 1941 to Abbott et al., to print elapsed time indicia, such as shown at Sheet 7 of said patent as well as an identifying number for the machine 113 to make certain that a given card is not inserted in a different machine at the conclusion of the time. The printing operation takes place as handle 100 or 101 is moved toward the forward end 140 of the machine as above noted and may be triggered by a solenoid actuated by a trip switch 198 (FIG. 1) on movement of the carriage 126 toward the front 140 of the machine.

Figure 4:
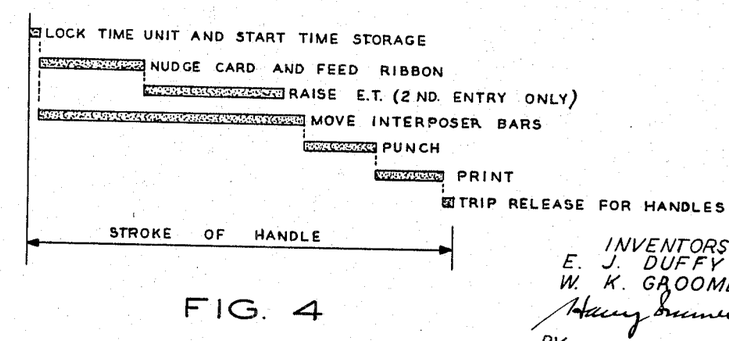
FIG. 4 is a schematic chart to further illustrate the operation of the device.

Referring to the FIG. 4 schematic chart of the operation of the device, it will be noted that on initial movement (FIG. 5) of either handle 101 or 100 time unit 33 is locked and the time storage 24 is activated. Time storage is provided to store time or indexes while the sensing operations occurs; unit 24 may be of any desired or convenient form. Example of a time storage unit in the art typical of time storage units which may be used for the purpose is that set forth in Patent 2,259,677 on page 3 column 2 lines 4–14. Time storage may be activated by means of stop lever 44 (FIGS. 1, 3 and 5) pivotally operated by collar 45 fixed to cable 114 so that end 46 on said lever acts as a stop for cam 25 when handle 100 or 101 is moved forward out of rest position. This stop prevents high point 29 of cam 25 from allowing arm 27 to index. As the handle is moved further forwardly, the card 131 is nudged and seated and the printing ribbon 143 is suitably moved by conventional means.

Figure 12:
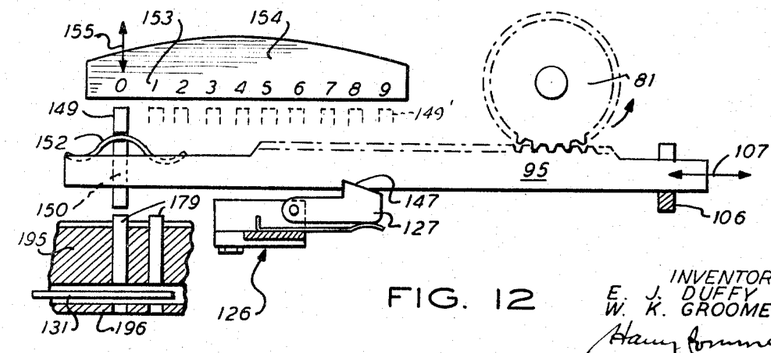
FIG. 12 is a plan, partly fragmentary, view of an interposer bar shown in zero position and actuator pinion and associated parts.
Figure 13:
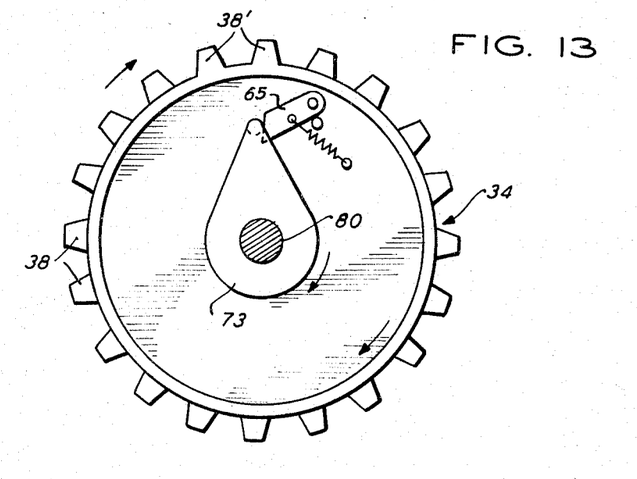
FIG. 13 is a top plan view, taken at line 13—13 of FIG. 7, of one of the time wheels of the device.
Figure 14:
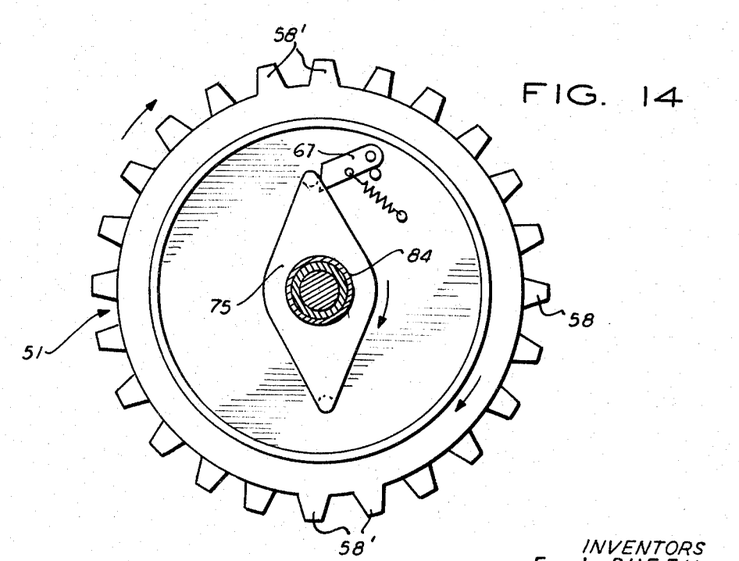
FIG. 14 is a top plan view, taken at line 14—14 of FIG. 7, of another time wheel of the device.
Figure 15:
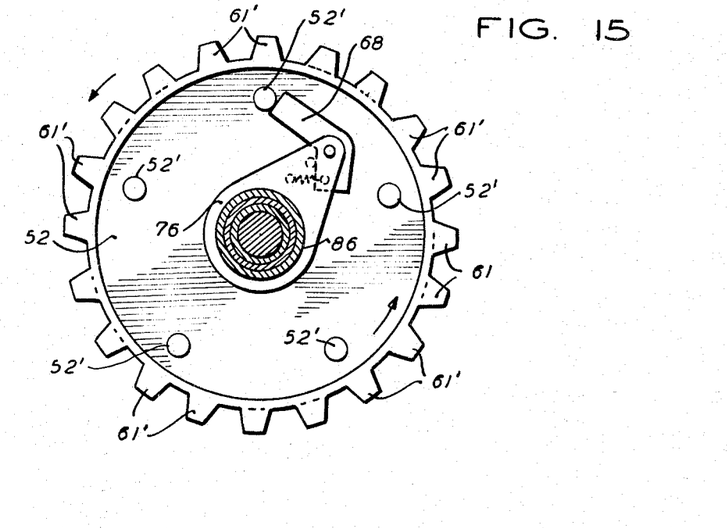
FIG. 15 is a bottom plan view, taken at line 15—15 of FIG. 7.
Figure 16:
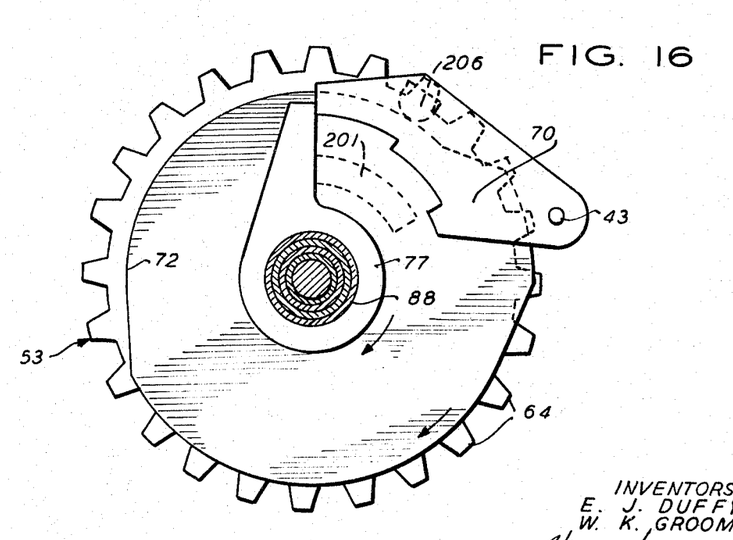
FIG. 16 is a top plan view, taken at line 16—16 of FIG. 7.

As above noted, mounted on the carriage 126 are the five spring loaded clutch fingers or pawls 127 which engage slots 147 in the racks (95–99) (FIG. 12) and move with the carriage to thus move the racks therewith toward the stop 148 (FIG. 1) thereby (FIG. 6) rotating gears 81, 83, 85, 87 and 89, rotating the sensing elements 73, 74, 75, 76, 77 against the sensing stops 65, 66, 52' and 70 in the time unit 33, described in detail elsewhere. When the sensing elements strike the stops, resistance is encountered. Thereupon in each case the particular spring loaded clutch finger engaging that particular rack in mesh with a gear which has thus engaged a time sensing stop, will slip out of engagement with the slot 147 in the rack (FIGS. 12 and 1). The carriage 126 continues to move toward stop 148, causing the fingers 127 to override the racks until said carriage strikes said stop at which time all sensing stops in time unit have been engaged.

Each rack 95–99 (FIGS. 12 and 19) has a spring loaded punch interposer 149 mounted in the recess or slot 150. The punch interposers have enlarged shouldered end 151, spring 152 being positioned between the shouldered end 151 of the punch interposer and the rack 95. The punch interposer 149 is thus spring urged to upper (FIG. 19) position.

From the above and FIG. 1 it will be seen that as the rack 95 moves toward the (right hand) stop 148 the punch interposer 149 is likewise carried thereby to the right, as shown by the dotted lines 149' (FIG. 12); thus the punch interposer moves progressively to positions indicated by higher number markings 153 on the punch plate 154 of a width equal to dotted positions 149'. Punch plate 154 actuates punch interposers in racks 95–97; punch plate 154' (FIG. 17) directly below 154 actuates punch interposers in racks 98 and 99. The plates 154 and 154' may be slidably mounted in the casing 113 as on bearings 157, movement being imparted thereto, during the stroke of handles 101 and 100. To thus end plate 154 is shown provided with a cam surface 156 formed thereon to be engaged by cam slide 158; plate 154' is provided with cam surface 156' engaged by cam slide 158'.

It will be seen that actuation of handle 101 in a direction toward front 140 of unit moves flange end 159 of cam slide 158 and flange 159' of cam slide 158' together, by means of extended pin 119 of bracket 103, to cause punch plates 154 and 154' to punch a 5 digit number 162, 162a, 162b, 162c, 162d (FIG. 10) as start time of a time period.

Return spring 160 may be provided, secured at one end to collar 161 fixed to belt 114 and to the casing 113 (not shown) at the other end to return the belt 114 on completion of the operating strokes of handles 101 or 100.

Figures 17, 18, 19, 20:
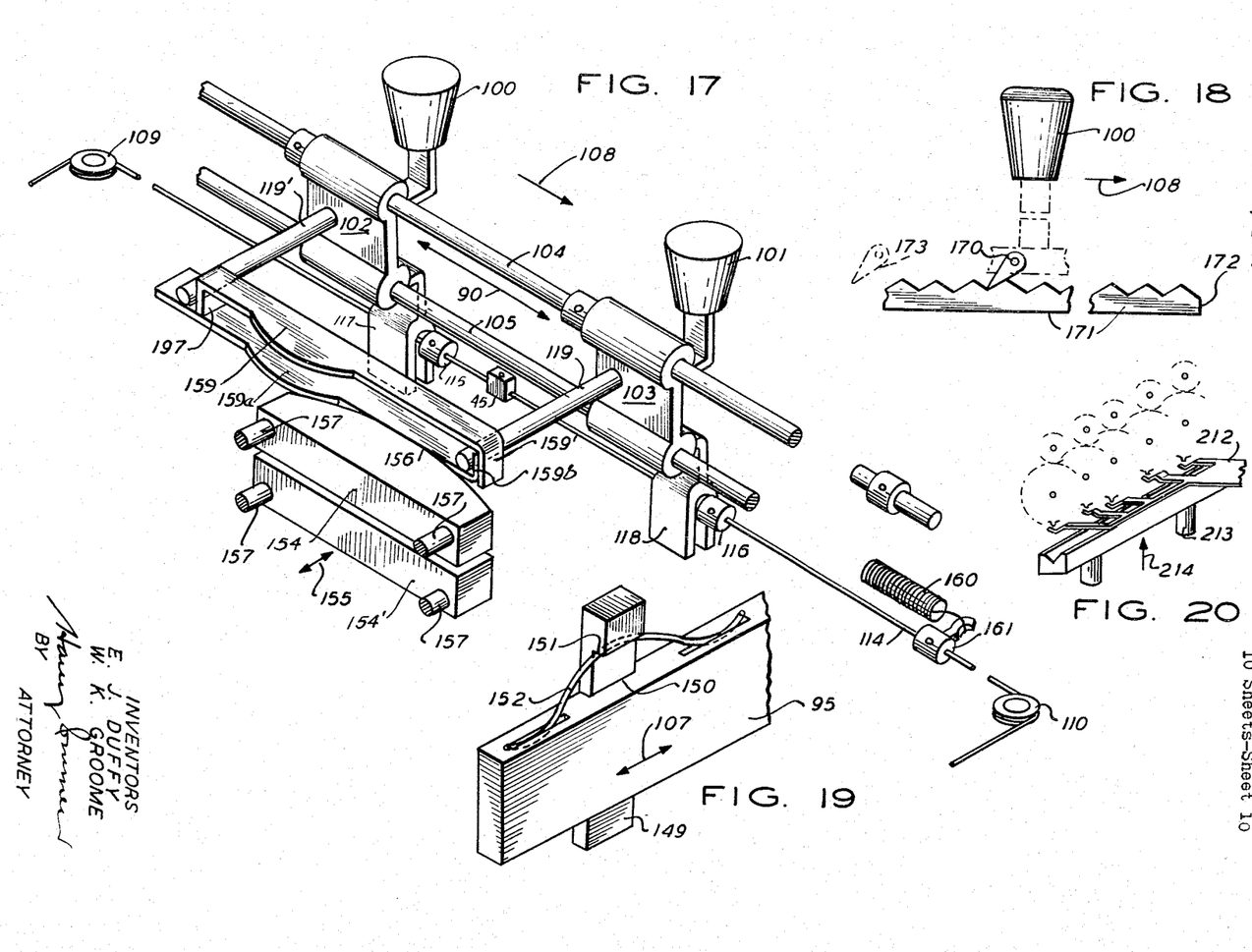
FIG. 17 is a fragmentary, partly sectional, perspective view of operating handles of the device and associated parts.
FIG. 18 is a fragmentary, perspective view of a handle and associated rack and pawl.
FIG. 19 is a fragmentary, perspective view of a typical interposer bar or rack (95) and associated punch interposer 149.
FIG. 20 is a perspective view of a detent and associated parts for the time wheels.

From the above it will be apparent that on moving the handle 101 to the right in FIG. 17 the various punch interposers 149 in the racks 95–99 will be moved into one of the dotted line positions (FIG. 12) in front of punching plates 154 and 154'; said positions dictated by the location of the stop on respective various time wheels. Engagement of cam slides 158 and 158' with the said punching plates will then move said punch interposers to cause actuation of specific punches in punch assembly 195 thru card 131 and into die assembly 196, thereby marking the in time 162, 162a, 162b, 162c, and 162d as in FIG. 10.

The card will simultaneously as above described have the "in time" printed indicia such as 146 (FIG. 10) printed thereon. After the card has been punched and printed as above noted, the card is removed from the machine and, upon completion of the time period (such as a telephone conversation, for example, to be marked on the card) the card is reinserted into the guide 132 to register position as above described and the second handle 100 is then drawn toward the front 140 of the machine. By this operation card 131 and printing unit 145 are raised together to align out time area 169, 169a, 169b of card with punch plate 154 and to insure concentric printing of indicia 146' with respect to indicia 146. Any suitable mechanism may be used to alter the relative planar relation of the card and the punching means. For example (FIG. 5) the bracket 102 for handle 100 may have a depending bar 163 (FIG. 5) extending downwardly and then angularly as at 164 around a pin 165 fixed to the printer unit 145, extended portion 164 terminating in cam surface 166. Accordingly, as the handle 100 is moved to the front 140 of casing 113, cam surface 166 of bar 163 engages pin 165, thereby elevating the printing unit 145. The printer unit 145 is mounted on links 167, 168 connected at opposite ends to the casing 113 and the printing unit 145, so that as the bar 163 moves the printing unit upwardly, the latter will move parallel with the bottom of the casing. Handle 100, by means of pin 119' of bracket 102, then moves flange 197 of cam slide 158 to cause punch plate 154 alone to punch a 3 digit number 169, 169a, 169b as stop time of the time period. Preferably a pawl-ratchet arrangement is provided as shown in FIGS. 3 and 18. A rack 171 is mounted on the casing 113 and is engaged by the pawl 170 so that once the handle 100 or 101 is moved toward the right (indicated by the arrow 108) the operator cannot reverse until completing the stroke when the pawl reaches the end 172, of the rack 171; the pawl drops off and permits the handles 100 or 101 to be returned to the (dotted line) position shown at 173 at the left hand end of FIG. 18.

Operation of time unit 33 is as follows: The device is actuated by engagement of pawl 31 on reciprocation of arm 27 with ratchet 32 which is unitary with tenths of minutes wheel 34; ratchet 32 is indexed by pawl 31 for a tenth of a revolution (36°) every 6 seconds.

Each full revolution of tenth of minutes wheel 34 (10 indexes and equal to one minute) indexes unit minute wheel 50 one tenth of a revolution (36°) by means of spool gears 54 and 55.

Each revolution of unit minute wheel 50 (10 indexes and equal to 10 minutes) indexes tens of minutes wheel 51 one twelfth of a revolution (30°) by means of spool gears 56 and 57.

Each half revolution of tens of minutes wheel 51 (6 indexes and equal to 60 minutes) indexes unit hours wheel 52 one tenth of a revolution (36°) by means of spool gears 59 and 60.

Each one fifth revolution of unit hours wheel 52 (2 indexes and equal to 2 hours) indexes tens of hours wheel 53 one twelfth of a revolution (30°) by means of spool gears 62 and 63.

Figure 7A:
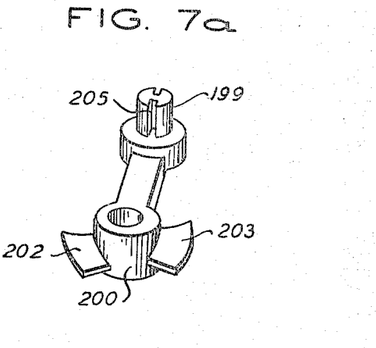
FIG. 7a is a fragmentary perspective view of a pin setter for controlling the pins shown in greater detail in FIGS. 8 and 9, FIGS. 8 and 9 are enlarged elevational views of the pins of time wheel 52 (also shown in FIG. 7) and schematically showing the pin setter for extending (FIG. 8) or retracting (FIG. 9) the pins.
Figure 8:
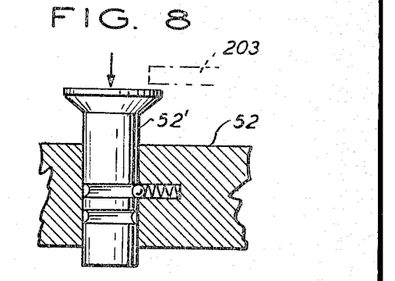
Figure 9:
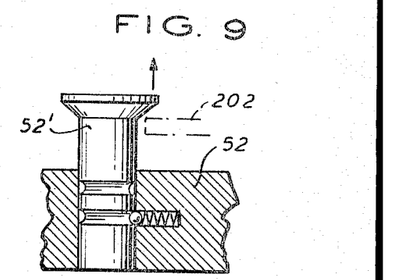

Wheel 52 carries (5) retractible pins 52', equally spaced, which are extended or retracted by pin setter 200 (FIGS. 6, 7 and 7a) between wheels 52 and 53. Pin setter 200 is normally urged by spring 204 into a position clear of pins 52′ and is axially slidably keyed as at 205 on a suitable bearing 199 to prevent rotation. In operation one pin 52′ is extended, downwardly, as shown in FIG. 8, to serve as the time indicator for sensing and the four remaining pins are retracted. The sensing pin is at "0" position at the beginning of each day (time 00:00.0).

Wheel 52 is indexed 21 times (2.1 revolutions and equal to 21 hours) during which time wheel 53 has been indexed 10 indexes (300°).

When wheel 52 receives the 22nd index it in turn causes the 11th index of wheel 53 which moves pin setter 200 axially toward wheel 52, by means of cam lobe 201. The pin setter 200 is now in position to extend and retract pins. When wheel 52 is indexed for hour 23 the sensing pin comes into contact with surface 202 on the pin setter. Another pin—second behind the sensing pin (144°) comes into contact with surface 203, 144° behind surface 202 on the pin setter. When wheel 52 receives the 24th index, the sensing pin is retracted by cam surface 202—at the same time cam surface 203 extends the pin, which moves into "0" position and becomes the sensing pin for the next 24 hour period. This automatic resetting eliminates the need for manual reset to maintain correct time thru successive 24 hour periods.

During this 24th index, wheel 52 the 12th index of wheel 53 which carries cam lobe 201 to drop off point, allowing spring 204 to move the pin setter back out of its work position.

In agreement with this indexing sequence cam 72 on wheel 53 determines sensing positions on sensing stop 70 as follows:

| Index Position Wheel 53 | Cam 72 | Sensing Stop 70 |
| --- | --- | --- |
| 0 Hours to 9 Hours | Dwell | 0 Sensing Step. |
| 9–10 Hours | Rise | |
| 10 Hours to 19 Hours | Dwell | 1st Sensing Step. |
| 19–20 Hours | Rise | |
| 20 Hours to 23 Hours | Dwell | 2nd Sensing Step. |
| 23–0 Hours | Drop Back to | 0 Sensing Step. |

Time setting FIG. 6 is carried out in the following sequence:

(1) Restore to "0" setting as follows:
Wheels 34, 50, 51, 52 and 53 are advanced by external means to align with a "0" setting reference 194 provided (FIG. 1) starting with tenths of minutes and proceeding to 10's of hours.
Numbers either stamped, engraved or printed are provided on periphery of each wheel in the following pattern

| Time Wheel | Setting Numbers | Sequence |
| --- | --- | --- |
| 34 | 207 | 0, 1, 2, 3, 4, 5, 6, 7, 8, 9. |
| 50 | 208 | 0, 1, 2, 3, 4, 5, 6, 7, 8, 9. |
| 51 | 209 | 0, 1, 2, 3, 4, 5, 0, 1, 2, 3, 4, 5. |
| 52 | 210 | 0, 1, 0, 1, 0, 1, 0, 1, 0, 1. |
| 53 | 211 | 0, 2, 4, 6, 8, 10, 12, 14, 16, 18, 20, 22. |

Orientation of setting numbers on wheel is such that "0" number aligns with "0" setting reference 194 when sensed position of wheel would register 0 in punching.

(2) Setting time unit 33 to agree with clock time. Actual time is set beginning with unit hours wheel 52.
(Rotation of wheel 52 will cause wheel 53 to advance as previously described.) Wheel 52 is advanced to the reference 194 until the numbers on wheels 52 and 53 total the desired hours, such as:

| Indication on Wheel 53 | Indication on Wheel 52 | Actual Time Setting (Hours) |
| --- | --- | --- |
| 0 | 0 | = 0 |
| 0 | 1 | = 1 |
| 2 | 0 | = 2 |
| 2 | 1 | = 3 |
| 10 | 0 | = 10 |
| 10 | 1 | = 11 |
| 20 | 0 | = 20 |
| 20 | 1 | = 21 |

The remaining wheels are set to reference 194 in this order:

(3) Tens of minutes; unit minutes and tenths of minutes and are read directly.

Springs 39, 40 and 41 (FIG. 6) on spool gear halves 54, 55, 56, 57, 59, 60 are used as clutches to transmit rotation from input gears 54, 56 and 59 to output gears 55, 57 and 60 respectively when accepting a time advance. The clutch action is required when setting time since slipping takes place between these digits.

Detent required for the time wheels may take the following form.

Multiple leaf spring 212 (FIG. 20) fixed to casing 113 detents each time wheels are indexed, at a point 180° away from spool gears. This insures detenting against a tooth each index and every wheel since they are 20 or 24 teeth.

A lock 213 (FIG. 20) slidably mounted to allow movement in arrow direction 214 and engagement with spring 212 is brought into position against all detents when time storage begins and prior to sensing.

In our structure, at the forward end 140 of the device, time is recorded by the straight line time indicator 37 actuated by the motor 20 through gearing to arm 27 and extension 27a which drives pawl 35 which drives ratchet 36 driving the straight line time indicator 37. Simultaneously the time wheels (FIG. 6) are actuated to true time through the ratchet 32 and thus wheel to wheel time rotation as in FIG. 7. On actuating time-in handle 101 the racks 95–99 are moved with movement of the carriage 126 fixed to the belt to thus rotate gears 81–89 until the latter encounter the stops on the time wheels; thereupon the resistance causes spring loaded clutch finger 127 to move downwardly and out of engagement with the particular rack thus concerned and continues on with the carriage without that rack. Thus each rack finds its stop and each clutch finger 127 moves out of engagement with the rack thus concerned. The particular location of the rack carried punch interposer bar 149 (FIG. 19) is thus determined by the stop position of the rack. The punch interposer bars thus are juxtaposed according to time of insertion of the card (punchings 162–162d). Punchings 169, 169a, 169b on actuation of out-time handle 100 are similarly achieved.

We claim:
1. In a time mechanism for indicating times with respect to a card positioned in said device, means actuated in time sequence, a plurality of time wheels, means connecting the time wheels to said means actuated in time sequence so that each wheel will, on rotation, measure different time values, stops carried by said wheels, rotatable stop sensor positioned in said device for rotation into contact with said stops, means connected to said sensors for movement thereof into engagement with said stops, actuator bars engaging said last named means for moving the sensors into engagement with said stops, indicating members carried by and movable with said actuator bars, whereby, on movement of said actuator bars, the sensors will be moved into engagement with said stops, disposing the indicating members in direct relation to the extent of movement of said actuator bars, and means to move the indicating members with respect to the card, to thereby indicate the time values so sensed.

2. In a time mechanism for indicating times as set forth in claim 1, said actuator bars so engaging said rotatable stop sensors by separable means, to disengage said sensors and actuator bars, when said sensors so engage the stops.

3. In a time mechanism for indicating times as set forth in claim 1, clutch means engaging the time wheels to facilitate setting time.

4. In a time mechanism for indicating times as set forth in claim 1, members movably positioned in a time wheel and means to selectively move said movable members to thus serve as sensor stops.

5. In a time mechanism for indicating times as set forth in claim 1, an operator member, a belt member connected to and being driven by said operator member and with said means for moving the indicating members with respect to the card.

6. In a time mechanism for indicating times, as set forth in claim 1 means for storage of time during the time indicating operations.

7. In a time mechanism for indicating times, as set forth in claim 1, said means operating the actuator bars including linearly movable members and handles connected thereto.

8. In a time mechanism for indicating times with respect to a card positioned in said device, means actuated in time sequence, a plurality of time wheels on a common axis, means connecting the time wheels to the said means actuated in time sequence so that each wheel will, on rotation, measure different time values, stops carried by said wheels, rotatable stop sensors positioned in said device for rotation into contact with said stops, means concentric with said common axis and connected to said sensors for movement thereof into engagement with said stops, actuator bars engaging said last named means for moving the sensors into engagement with said stops, indicating members carried by and movable with said actuator bars, whereby, on movement of said actuator bars, the sensors will be moved into engagement with said stops, disposing the indicating members in direct relation to the extent of movement of said actuator bars, and means to move the indicating members with respect to the card, to thereby indicate the time values so sensed.

9. In a time mechanism for indicating times with respect to a card positioned in a card holder in said device, means actuated in time sequence, a plurality of time wheels, means connecting the time wheels to said means actuated in time sequence so that each wheel will, on rotation, measure different time values, stops carried by said wheels, rotatable stops sensors positioned in said device for rotation into contact with said stops, means connected to said sensors for movement thereof into engagement with said stops, actuator bars engaging said last named means for moving the sensors into engagement with said stops, indicating members carried by and movable with said actuator bars, whereby, on movement of said actuator bars, the sensors will be moved into engagement with said stops, disposing the indicating members in direct relation to the extent of movement of said actuator bars, and means to move the actuator bars and thereby the indicating members with respect to the card, to thereby indicate the time values so sensed, said moving means comprising an operating member, and means connecting said operating members with said card holder to move the card holder and thereby the card, to thus position the card for so indicating time values at a position determined by said movement of the card.

No references cited.

RICHARD B. WILKINSON, *Primary Examiner.*

J. W. HARTARY, *Assistant Examiner.*